(12) United States Patent
Kumar et al.

(10) Patent No.: US 12,368,574 B2
(45) Date of Patent: Jul. 22, 2025

(54) SIDE-CHANNEL RESISTANT MULTIPLICATIVELY MASKED ENCRYPTION ENGINE WITH ZERO-VALUE ATTACK DETECTION

(71) Applicant: Intel Corporation, Santa Clara, CA (US)

(72) Inventors: Raghavan Kumar, Hillsboro, OR (US); Sanu Mathew, Portland, OR (US); Sachin Taneja, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 18/190,308

(22) Filed: Mar. 27, 2023

(65) Prior Publication Data
US 2024/0333471 A1  Oct. 3, 2024

(51) Int. Cl.
*H04L 29/06*  (2006.01)
*H04L 9/06*  (2006.01)

(52) U.S. Cl.
CPC .......... *H04L 9/0631* (2013.01); *H04L 9/0637* (2013.01)

(58) Field of Classification Search
None
See application file for complete search history.

(56) References Cited

U.S. PATENT DOCUMENTS

| 10,985,903 | B2 | 4/2021 | Kumar |
| 11,416,165 | B2 | 8/2022 | Mathuriya |

| 2005/0207571 | A1* | 9/2005 | Ahn | H04L 9/0631 380/28 |
| 2006/0023875 | A1* | 2/2006 | Graunke | H04L 9/065 380/28 |
| 2016/0269175 | A1* | 9/2016 | Cammarota | H04L 9/002 |

FOREIGN PATENT DOCUMENTS

CN   111245598 A   6/2020

OTHER PUBLICATIONS

Raghavan, Kumar, et al., "A Gbps SCA-Resistant Multiplicative-Masked ARS Engine in Intel 4 CMOS," 2022 Symposium on VLSI Technology & Circuits Digest of Technical Papers, 2022, 2 pages.
International Searching Authority, International Search Report and Written Opinion dated Apr. 19, 2024 in International Application No. PCT/US2023/084043 (10 pages).
Easttom, "A generalized methodology for designing non-linear elements in symmetric cryptographic primitives." 2018 IEEE 8th Annual Computing and Communication Workshop and Conference (CCWC), Feb. 26, 2018, pp. 444-449.

* cited by examiner

*Primary Examiner* — Andrew J Steinle
(74) *Attorney, Agent, or Firm* — Schwabe, Williamson & Wyatt, P.C.

(57) ABSTRACT

In one embodiment, a method comprises: combining, in a first adder circuit of a cryptographic engine, a round key with masked plaintext to generate an additively masked input; converting, in a first converter of the cryptographic engine, the additively masked input to a multiplicatively masked input; and performing, in a substitution box circuit of the cryptographic engine, a non-linear inverse operation on the multiplicatively masked input when the multiplicatively masked input is non-zero, and performing the non-linear inverse operation on a random non-zero value when the multiplicatively masked input is zero. Other embodiments are described and claimed.

20 Claims, 9 Drawing Sheets

SIDE-CHANNEL RESISTANT MULTIPLICATIVELY MASKED ENCRYPTION ENGINE WITH ZERO-VALUE ATTACK DETECTION

BACKGROUND

Physical power/electromagnetic (EM) side-channel resistance is a desired property for Advanced Encryption Standard (AES) hardware. One manner of providing such protection is an additive-masked design, which incurs more than double area and power overheads of a base AES hardware, thereby limiting its usage. Another alternative is to perform multiplicative masking; however there remains a concern of an attack with zero-value inputs. Typical designs of this sort, even with zero-value detection, still can suffer from information leakage, particularly in the form of Hamming distance information leakage due to mask reuse.

DETAILED DESCRIPTION

Figure 1:
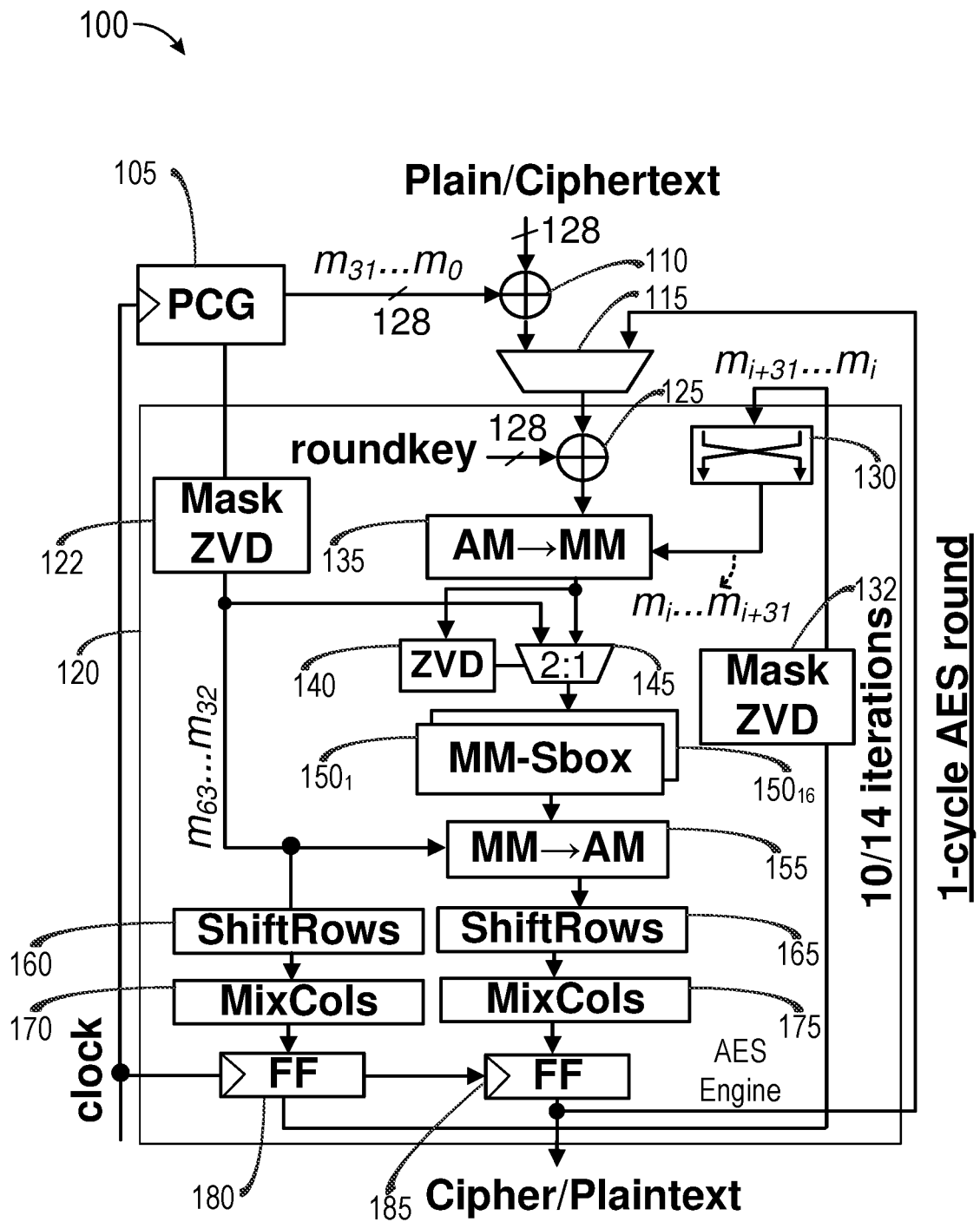
FIG. 1 is a block diagram of a cryptographic circuit in accordance with an embodiment.

In various embodiments, cryptography in accordance with a given AES implementation provides for a side-channel resistant multiplicatively masked arrangement with balanced zero-value detection circuitry. To be compute efficient, embodiments may be configured to convert additively masked operands to multiplicatively masked operands before execution of a non-linear inverse operation. The balanced zero-value detector circuitry routes random operands for use in this inverse operation when a zero value is detected. Thereafter the multiplicative masked operands are converted to an additive domain for subsequent processing.

As mentioned, one countermeasure against power and EM side-channel attacks is a random additive masking scheme, where a random mask that is statistically independent of plaintext is added before a first key addition operation. The random additive masking also provides a provably secure countermeasure against first-order attacks, as the random mask breaks a correlation between switching activities and a corresponding power signature. However, the presence of this random mask also corrupts correctness of the final ciphertext. Hence, to recover the correct ciphertext, mask compensation factors are computed, such that at any point of computation, the correct output can be recovered by adding the masked output with the corresponding mask.

However, in conventional AES implementations, the non-linear inverse operation in a substitution box (Sbox) uses an expensive Fermat's little theorem to compute an inverse value $X^{-1}$. Conventionally, this inverse is computed by raising the input to the power of 14, which incurs high power consumption, area, and complexity costs, including presence of a large number of 4-bit multipliers (e.g., 11 additional multipliers), undesirably increasing area and power overheads.

In embodiments, multiplicative masking enables a simpler computation of a non-linear operation by converting inputs to a multiplicative domain, where masked data is represented as a product of data and a mask (data×mask), rather than as a sum of data and mask as in additive masking.

To enable simpler computation of the linear operations, multiplicative masking is solely employed for non-linear inverse operations, while linear operations including shift rows, mix columns and key addition are protected using additive masking. With embodiments, secure mask conversions are performed to convert between additive and multiplicative domains, to avoid unintentional information leakage.

Multiplicative masked designs are susceptible to a special-form of side-channel attacks in the form of zero value attacks. Any zero value Sbox input is not protected by masking due to the multiplicative nature of random mask. Hence, embodiments incorporate in-situ zero-value attack detection and mitigation. The mitigation strategy includes routing random values to multiplicative Sbox circuitry, when a zero-value is detected at the Sbox input. Similarly, the engine also incorporates mask zero-value detection circuitry, where zero values on input and derived mask nibbles are corrected for accurate computation of AES output.

In various embodiments, cryptographic operations may be performed in accordance with an AES implementation. Such embodiments may be configured to perform cryptographic operations using a combination of additively-based operands and multiplicatively-based operands. More specifically as described herein, certain linear operations may be performed on the additively-based operands, while non-linear operations are performed on the multiplicatively-based operands. In addition, embodiments provide mechanisms to detect zero values in operands (both data and mask values) and provide substitute values for use, to prevent signatures from being detected.

Referring now to FIG. 1, shown is a block diagram of a cryptographic circuit in accordance with an embodiment. More specifically as shown in FIG. 1, cryptographic circuit 100 includes an AES engine 120, along with additional front-end circuitry. In an embodiment, cryptographic circuit 100 is organized as a single cycle per round unified encrypt and decrypt engine, with support for 128-bit and 256-bit keys, resulting in a total latency of 10 or 14 cycles.

As shown, a random number generator 105 is present and used to generate random mask values. In an embodiment, random number generator 105 is implemented as a permuted congruential pseudo-random number generator. More specifically in one embodiment, random number generator 105 may be a 256-bit (b) generator that produces a single 128$b$ mask every clock cycle for masking intermediate rounds.

As shown in FIG. 1, random number generator 105 generates 128 bits, shown as a plurality of nibbles $m_{31}$-$m_0$. As illustrated, this mask value is provided to an exclusive-OR (XOR) circuit 110 that performs an addition operation between the mask value and incoming plain or ciphertext. For purposes of discussion, an encryption direction is described, and thus this incoming data is plaintext. However, understand that similar circuitry as shown in FIG. 1 may be used to decrypt ciphertext by providing ciphertext as the input.

After the plaintext is added with the random mask value in XOR circuit 110, the sum is provided to a multiplexer 115. For this first round, multiplexer 115 sends this masked plaintext to an XOR circuit 125 of AES engine 120, where it is added with a round key (which is 128b). This additive form of the masked plaintext is converted to a multiplicative form in a converter 135. Converter 135 performs an additive mask-to-multiplicative mask conversion, details of which are described further below. To this end, converter 135 further receives a reflected mask value from a mask reflection circuit 130. Mask reflection circuit 130 receives an updated mask value $m_{i+31}$–$m_i$ and reverses the order of the nibbles to thus provide a reflected mask value $m_i$–$m_{i+31}$ to converter 135.

The usage of the same mask term ($m_0$) results in a partial information leakage, which is avoided by using the reflected mask. In addition, usage of a reflected mask eliminates the need for a fresh 128b mask, thereby reducing area overhead for another random number generator.

Referring now to Table 1, shown is an inter-node correlation measure for a baseline mask input, and a reflected mask input (as realized using reflection circuit 130 of FIG. 1). As shown, significantly reduced correlation results from this reflection operation.

TABLE 1

| Inter-node Correlation | |
|---|---|
| Mask type | |
| Input | 0.022 |
| Reflected | 0.006 |

The resulting multiplicative plaintext masked data is provided to another multiplexer 145 and to a zero-value detector 140. In embodiments herein, zero-value detector 140 is implemented as a dual-rail balanced zero-value detector. When zero-value detector 140 detects that a given nibble of the multiplicatively masked value is zero, a substitute value, namely, non-zero random (mask) data, is passed through multiplexer 145 to a multiplicatively masked substitution box (MM-Sbox or Sbox) circuit 150. More specifically as shown, there may be a plurality of instances of this circuitry, e.g., 16 instances (Sbox $150_{1-16}$). As will be described further below, Sbox 150 is configured to perform a non-linear inverse operation on the input data. By way of the multiplicative property, this Sbox operation is more computationally efficient than an additive Sbox operation.

Still referring to FIG. 1, the Sbox output is provided to a converter 155 that performs a multiplicative-to-additive conversion. Furthermore, when a zero value has been detected, the same random data used for the Sbox computation may be used to return functionally correct data. After the conversion, the resulting additive form Sbox output is provided for further processing, namely shift row processing in a shift row operator 165 and mix column processing in a mix column operator 175. The resulting iterative data is provided to input multiplexer 115 through a flip-flop 185. A final value corresponding to resulting ciphertext at a conclusion of the given number of iterations is output via flip-flop 185.

Still referring to FIG. 1, the mask value generated in random number generator 105 also is provided to a mask zero-value detector 122. As will be described herein, mask zero-value detector 122 is configured to identify when a given nibble of the mask data is a zero value and to substitute a random non-zero mask value. Also note the presence of a parallel data path for similar shift row and mix column processing for mask data via a shift row operator 160 and a mix column operator 170. Via a flip-flop 180, the iterative mask values pass through another mask zero-value detector 132, prior to being reflected in reflection circuit 130.

Figure 2:
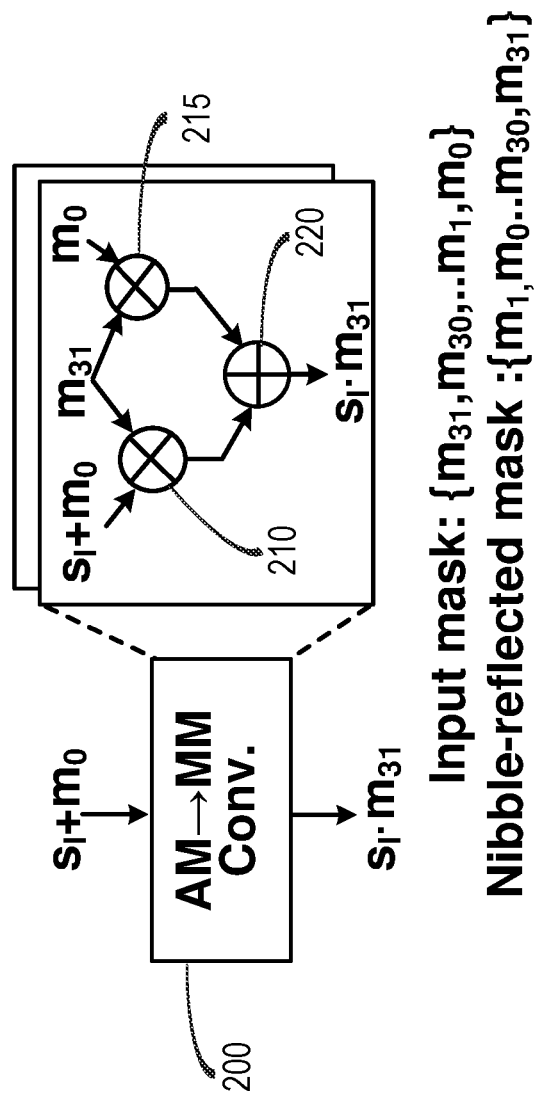
FIG. 2 is a block diagram of an additive-to-multiplicative converter in accordance with an embodiment.

As illustrated, a clock signal is provided to random number generator 105 and flip-flops 180, 185. Although shown at this high level in the embodiment of FIG. 1, many variations and alternatives are possible Referring now to FIG. 2, shown is a block diagram of an additive-to-multiplicative converter in accordance with an embodiment. As shown in FIG. 2, converter 200 is configured to receive an additive input and provide a multiplicative output. More specifically, converter 200 includes a pair of multipliers 210, 215, each configured to receive two operands and perform a multiplication to generate partial products that are then summed in an XOR circuit 220. Note that in the detailed view shown in FIG. 2, these operations are performed on corresponding nibbles, where the operations are illustrated for a low-order additive value $s_i+m_0$ which, via mask reflected operands, is converted to $s_i·m_{31}$.

Thus as illustrated in FIG. 2, converter 200 performs an additive-to-multiplicative mask conversion via a composite-field Galois-field (GF)($2^4$) multiplication. More specifically, this conversion operation is shown for a first nibble of an additively masked input ($s_i+m_0$) with a derived reflected mask $m_{31}$. The cross-product of mask terms $m_0$ and $m_{31}$ is computed through a non-critical parallel datapath to be added with the other partial product. The sum of the components results in a multiplicatively masked input term ($s_i·m_{31}$). Similarly, the operation is repeated for all the other input nibbles using the derived reflected masks.

Figure 3:
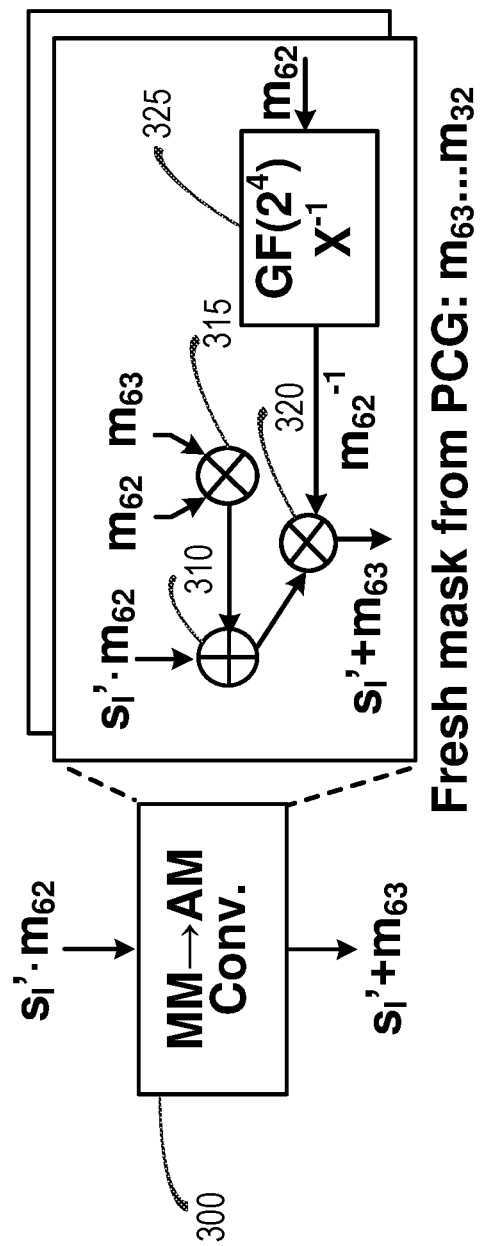
FIG. 3 is a block diagram of a multiplicative-to-additive converter in accordance with an embodiment.

Referring now to FIG. 3, shown is a block diagram of a multiplicative-to-additive converter in accordance with an embodiment. As shown in FIG. 3, converter 300 is configured to receive a multiplicative input (output of the Sbox) and perform a multiplicative-to-additive conversion to provide an additive output. As illustrated, converter 300 includes an XOR circuit 310 which adds a multiplicatively masked input with a product of a multiplier 315, which multiplies two mask nibbles together. The resulting sum is then multiplied in a multiplier 320 with an inverted mask nibble that is inverted in a Galois-field inverter 325. The resulting output is thus an additive form of the Sbox output.

Thus as shown in FIG. 3, this conversion may be performed by adding the input value ($s_i·m_{62}$) with the product of an independent mask term ($m_{63}$) and the input mask ($m_{62}$). The Galois-field 4b inverse of the input mask is computed through a parallel non-critical datapath and is multiplied with the output of the XOR gate. This results in computation of the additively masked input term si masked with the new mask $m_{63}$. The same operation is repeated for all the other input nibbles.

Figure 4:
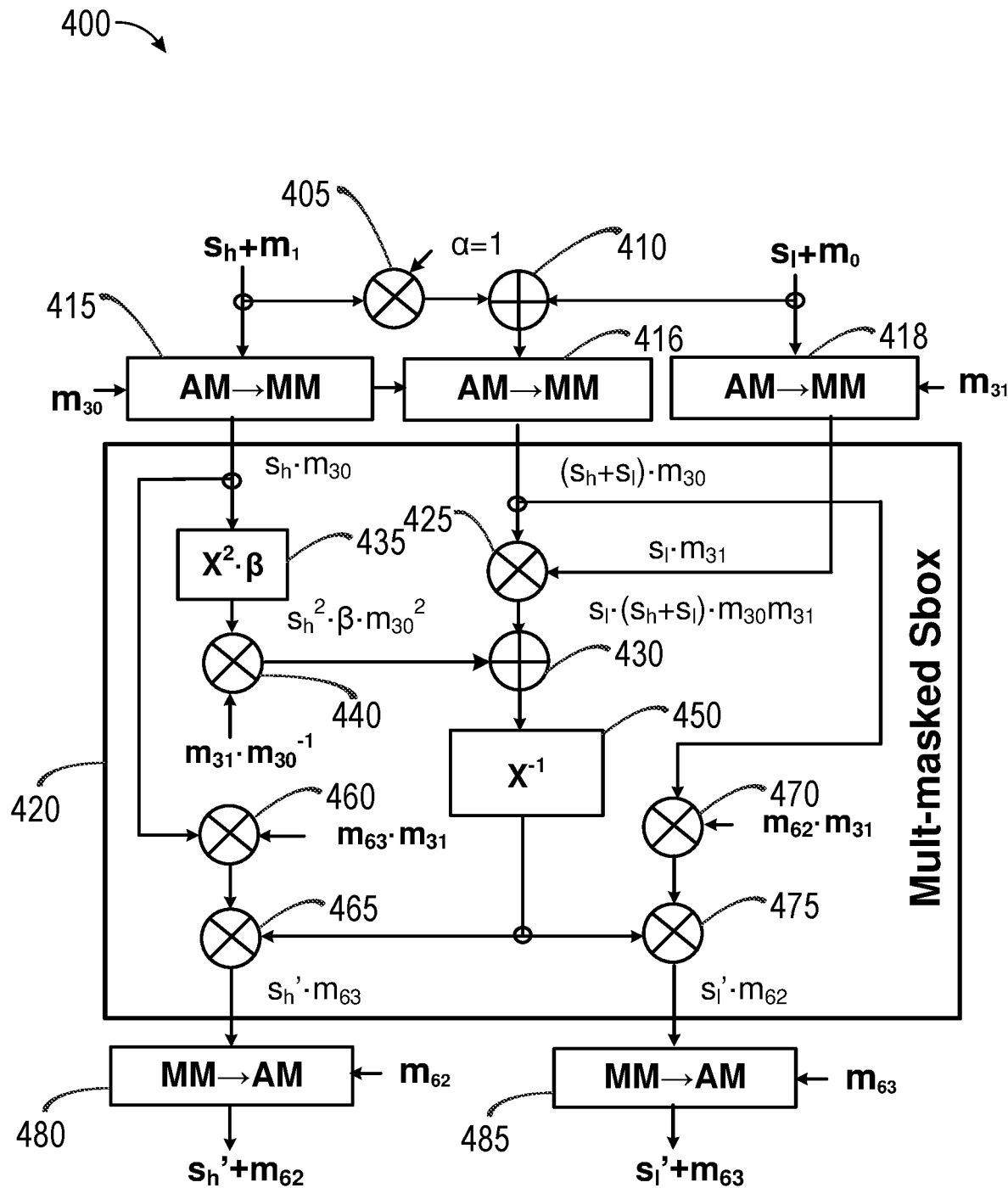
FIG. 4 is a block diagram of a multiplicatively-masked Sbox circuit in accordance with an embodiment.

Referring now to FIG. 4, shown is a block diagram of a multiplicatively-masked Sbox circuit in accordance with an embodiment that is configured to compute composite-field substitute bytes of the multiplicatively masked input operands. More specifically as shown in FIG. 4, circuitry 400, which is implemented in an AES engine, includes an Sbox circuit 420, front-end circuitry, and back-end circuitry. As shown, incoming additive mask values are converted in corresponding additive-to-multiplicative converters 415, 416, 418. The additive input values are further added together (after a high-order input is multiplied with a selected alpha value (e.g., 1) in a multiplier 405). Thus, the low order and high order additive inputs are converted to multiplicative form in converters 415 and 418, respectively, while the combined additive input is converted in converter 416.

With regard to Sbox circuit 420, respective squaring and multiplication operations are performed in circuit 435 and multipliers 425 and 440. The resulting squared and multiplied values are added together in an XOR circuit 430. As shown, multiplicative mask nibbles $m_{30}$ and $m_{31}$ seamlessly propagate through squaring and scaling operations, producing masks $m_{30}^2$ and $m_{30} \cdot m_{31}$. To align the mask operands before an addition, the mask term $m_{30}^2$ is multiplied with a pre-computed product of $m_{30}^{-1}$ and $m_{31}$.

The resulting sum is provided as a multiplicatively masked input to a non-linear inverter 450. As shown, non-linear operator 450 is implemented to perform a GF ($2^4$) inverse operation, as an $X^{-1}$ inversion operation. The resulting inverted value is then merged with new mask values (generated in multipliers 460, 470), via multipliers 465, 475 to merge these masks into the inverse output. The resulting masked products are then converted to additive form in multiplicative-to-additive converters 480, 485, resulting in additive forms of the Sbox outputs. These additive-based operands then are provided for further processing, namely, shift row and mix column processing.

Due to the multiplicative mask, the inverse operation is simplified to that of an unmasked AES implementation, resulting in 1.7× area savings compared to an expensive Fermat's little theorem-based additive AES implementation. Note that the fresh masks are used to avoid Hamming distance leakage during subsequent register updates (in mix columns and shift rows functions).

Figure 5:
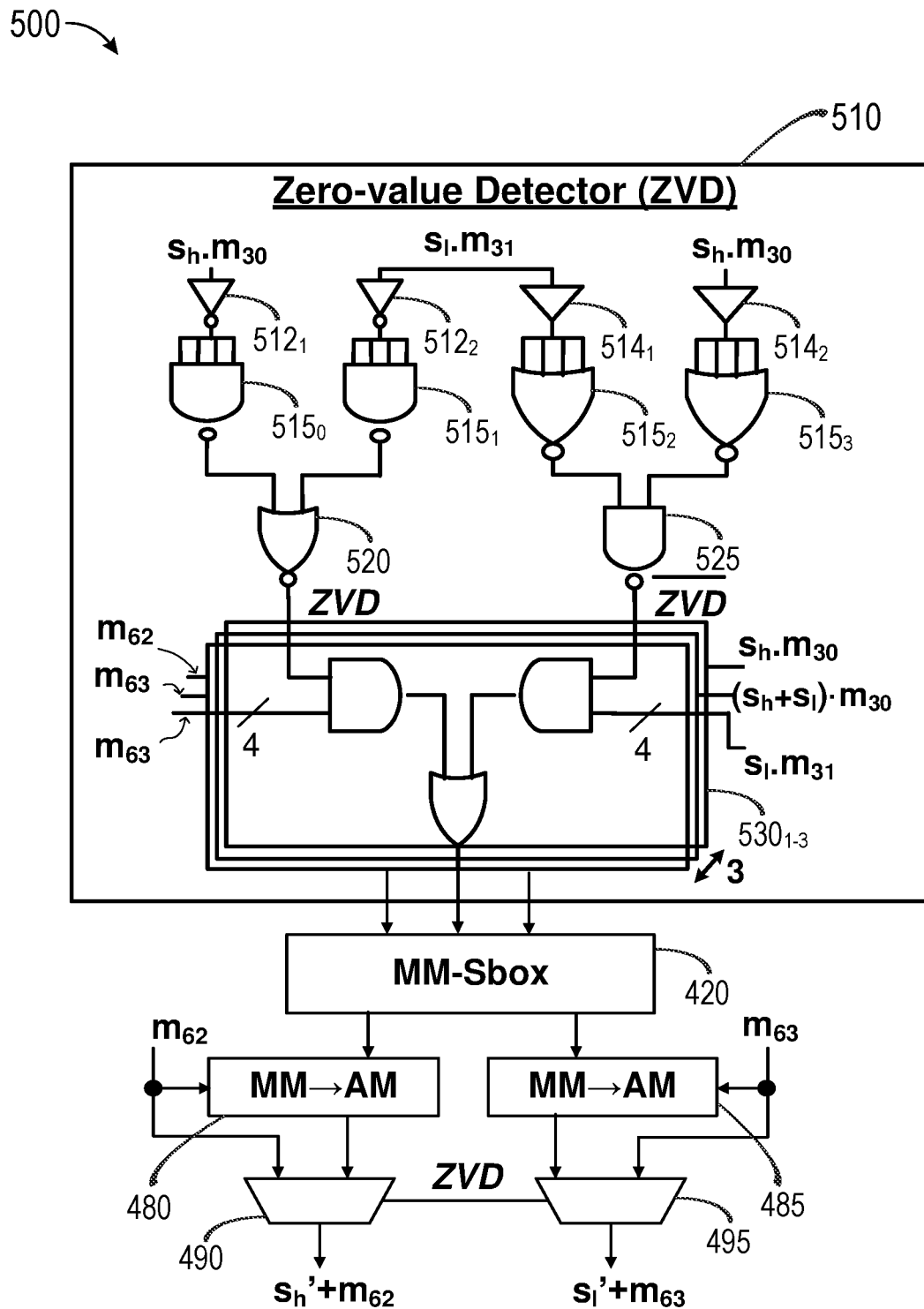
FIG. 5 is a block diagram of a dual-rail zero-value detector in accordance with an embodiment.

As discussed above, an AES engine in accordance with an embodiment incorporates an in-situ zero-value attack detector to pre-emptively thwart zero value attacks. Referring now to FIG. 5, shown is a block diagram of a zero-value detector and associated circuitry in accordance with an embodiment. As shown in FIG. 5, circuitry 500 includes a zero-value detector 510 to receive true and complementary values of multiplicative-based Sbox inputs. In embodiments, zero-value detector 510 is implemented as a dual-rail zero-value detector. As shown, incoming low and high order multiplicative values ($s_h \cdot m_{30}$ and $s_l \cdot m_{31}$) are input. Each of these values is provided to respective inverters $512_{1,2}$ and buffers $514_{1,2}$. Note that inverters 512 and buffers 514 are delay-matched buffers to prevent imbalanced paths.

In turn, the outputs of these inverters and buffers are provided to logic circuitry, which as shown include a pair of NAND gates $515_{0,1}$ and NOR gates $515_{2,3}$. The resulting outputs of these gates are in turn provided to additional logic gates, namely a NOR gate 520 and a NAND gate 525. With this arrangement, when all bits of either input are all zeros, a zero-value detection occurs. Thus, instead of passing the input masked value, a random non-zero substitute mask value is output. As illustrated, this occurs via operation of a set of balanced multiplexers $530_{1-3}$ which are implemented as balanced 2:1 multiplexers to select either the multiplicative input or the random non-zero value mask data to output to Sbox 420.

In operation, when a zero value is detected, the ZVD signal is asserted, while the complementary path is de-asserted. In that scenario, random mask values that are independent of the input are routed to the Sbox datapath via balanced multiplexers $530_{1-3}$, to prevent deterministic low switching activity. As shown multiplexers $530_{1-3}$ use both ZVD and ZVD bar inputs to enable a balanced load on both the true and complementary datapaths. In one or more embodiments, zero-value detector 510 incurs less than 10% area overhead.

Still referring to FIG. 5, further details of the operation that occurs when a zero value is detected are illustrated. Specifically as shown, after the Sbox output is converted back to additive form via converters 480, 485, additional multiplexers 490, 495, as controlled by the zero value detect signal ZVD are configured to pass the random non-zero mask values, instead of the input values when a zero value detection has occurred.

Figure 6:
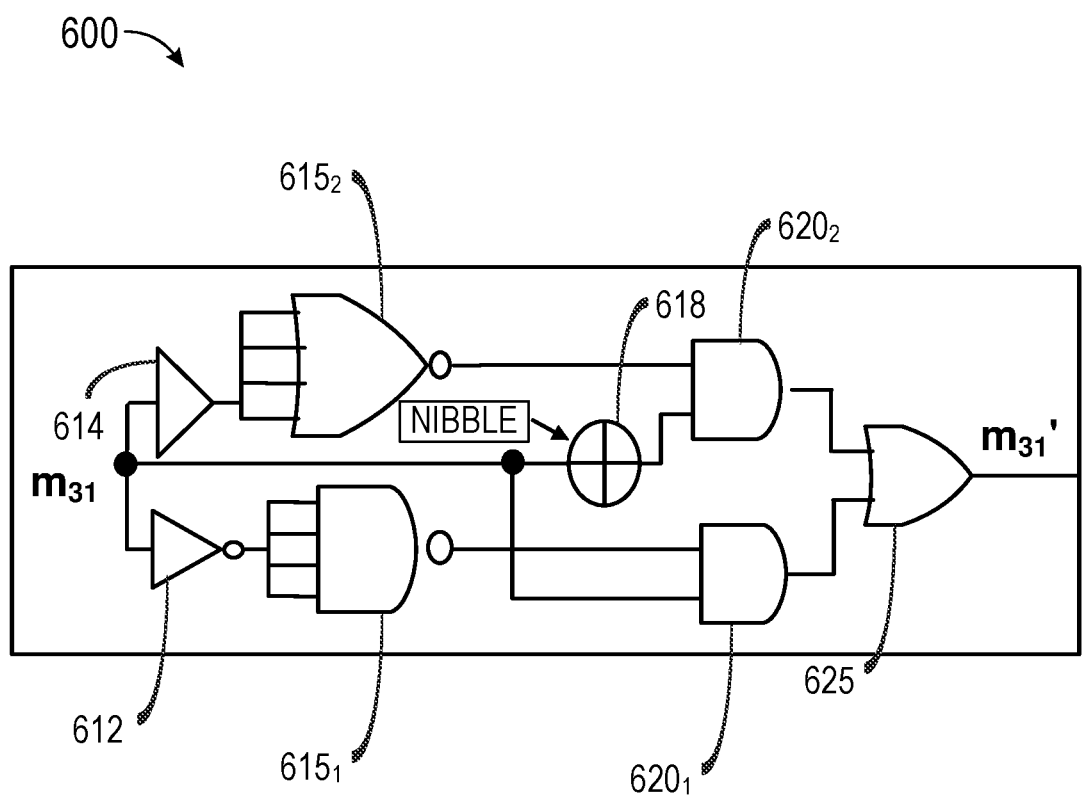
FIG. 6 is a block diagram of a mask zero-value detector in accordance with an embodiment.

For accurate functionality, correction of zero mask nibbles is also performed on a fresh mask from random number generator 105 (of FIG. 1), as well as derived masks. To this end, mask zero-value detectors 122, 132 (of FIG. 1) are present to correct zero value mask nibbles. Referring now to FIG. 6, a dual-rail mask ZVD circuit 600 is configured to detect zero value mask nibbles and convert such nibbles to random non-zero values.

As shown in FIG. 6, mask zero-value detector 600 is configured similarly to one path of zero-value detector 500. Thus an incoming mask nibble (shown as nibble $m_{31}$) is input via an inverter 612 and a buffer 614 into a NAND gate $615_1$ and a NOR gate $615_2$, respectively. The input mask nibble is further provided to an XOR circuit 618, where it is combined with a given nibble (e.g., a given one of nibbles 1-F). In turn, the outputs of logic gates 615 and XOR circuit 618 pass through NAND gates $620_{1,2}$ and thereafter the outputs of these gates are provided to a NOR gate 625, which thus outputs a mask value that corresponds to the original mask nibble when it is not a zero value and instead a random non-zero value when a zero value is detected.

In one or more embodiments, mask ZVD circuit 600 incurs less than 0.5% area overhead. Although shown at this high level in the embodiment of FIG. 6, many variations and alternatives are possible.

Figure 7:
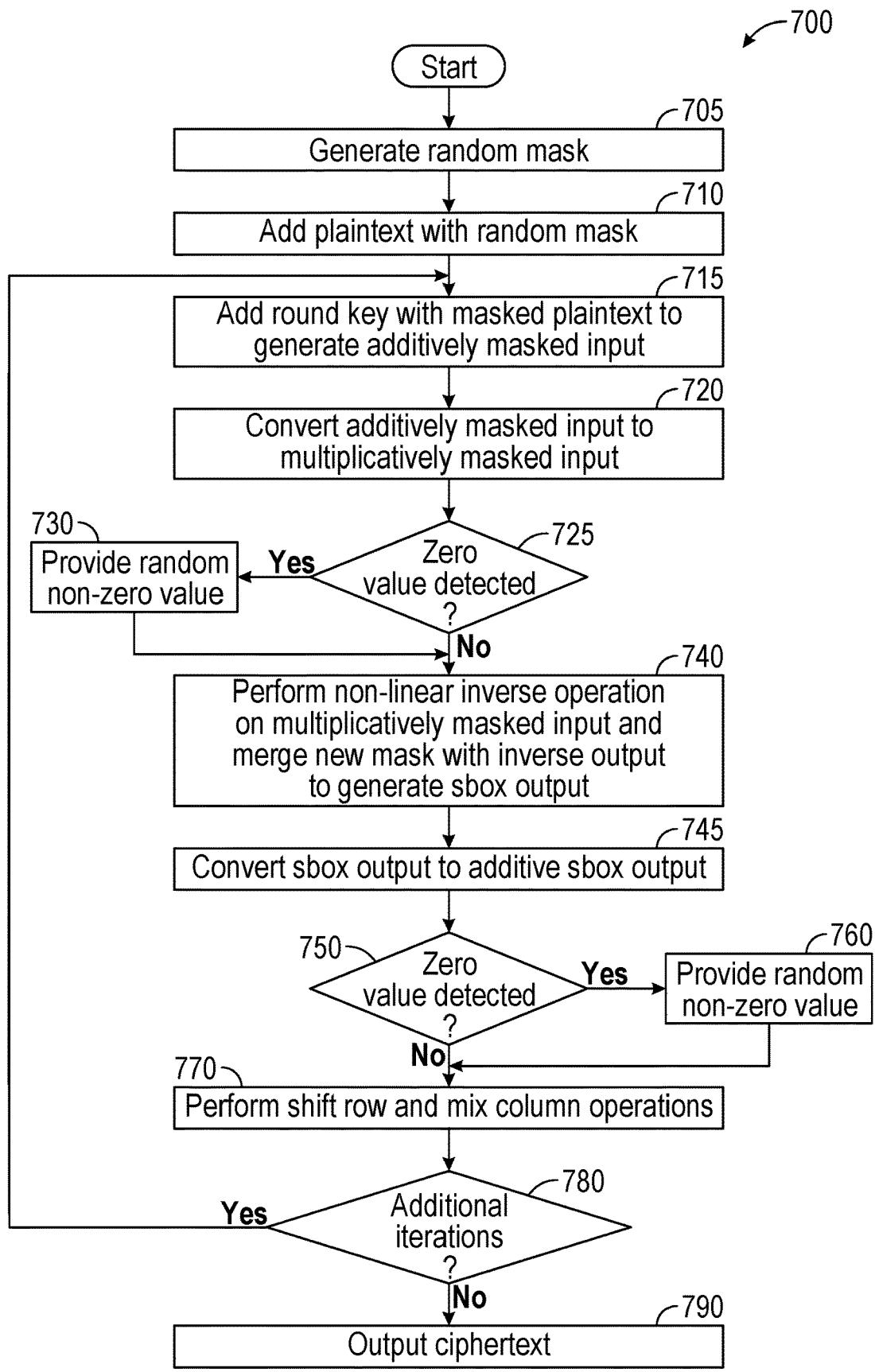
FIG. 7 is a flow diagram of a method in accordance with an embodiment.

Referring now to FIG. 7, shown is a flow diagram of a method in accordance with an embodiment. As shown in FIG. 7, method 700 is a method for performing encryption of incoming plaintext using an AES engine in accordance with an embodiment. As such, method 700 may be performed by hardware circuitry alone, and/or in combination with firmware and/or software.

As illustrated, method 700 begins at block 705 where a random mask is generated, e.g., in a random number generator. Next at block 710 plaintext is added with this random mask to generate a sum that corresponds to masked plaintext. At block 715, the masked plaintext is added with a round key to generate an additively masked input.

Thereafter at block 720 a conversion operation is performed. More specifically, an additive-to-multiplicative conversion operation is performed to convert the additively masked input to a multiplicatively masked input. Next control passes to diamond 725 to determine whether this multiplicatively masked input is a zero value. In embodiments this zero-value detection may be performed in a balanced dual-rail zero-value detector. If such zero value is detected, control passes to block 730 where a random non-zero value is provided in place of the zero-value detected operand.

Still with reference to FIG. 7, control passes to block 740 where a non-linear inverse operation is performed. This Sbox operation may be a relatively simple inverse operation (namely $X^{-1}$ inverse operation) on the multiplicatively masked input. As such, embodiments may provide significant power and compute savings, avoiding the expense of an $X^{-14}$ inverse operation, owing to performing this operation on the multiplicative form.

Still at block 740 the resulting inverse output is merged with a new mask (via multipliers within the Sbox) to generate an Sbox output. At block 745 this Sbox output is converted. More specifically a multiplicative-to-additive conversion is performed, resulting in an additive form of the output that can be efficiently permuted via shift row and mix column operations at block 770.

At this point a given iteration through the AES engine is completed, and it is determined at diamond 780 whether additional iterations are to be performed. As discussed above depending on operand width, there may be 10 or 14 iterations performed (for 128b and 256b operands, respectively). If additional iterations are to occur, control passes back to block 715, discussed above. Otherwise at block 790 the resulting ciphertext for the given plaintext input is output to a given destination, e.g., for storage or communication to a given a destination circuit, which may be within the same system or a different system. Understand while shown at this high level in the embodiment of FIG. 7, many variations and alternatives are possible. For example, the AES engine may perform decryption by receiving ciphertext input in place of the plaintext discussed above.

Multiplicative masking enables a simple computation of a masked inverse operation, whereas without an embodiment an additive masked implementation requires use of an expensive Fermat's little theorem for inverse computation. Embodiments may realize a substantial reduction (e.g., 1.8×) in area overhead as compared to an additively masked implementation, with a measure 35,000× improvement in side-channel resistance.

Figure 8:
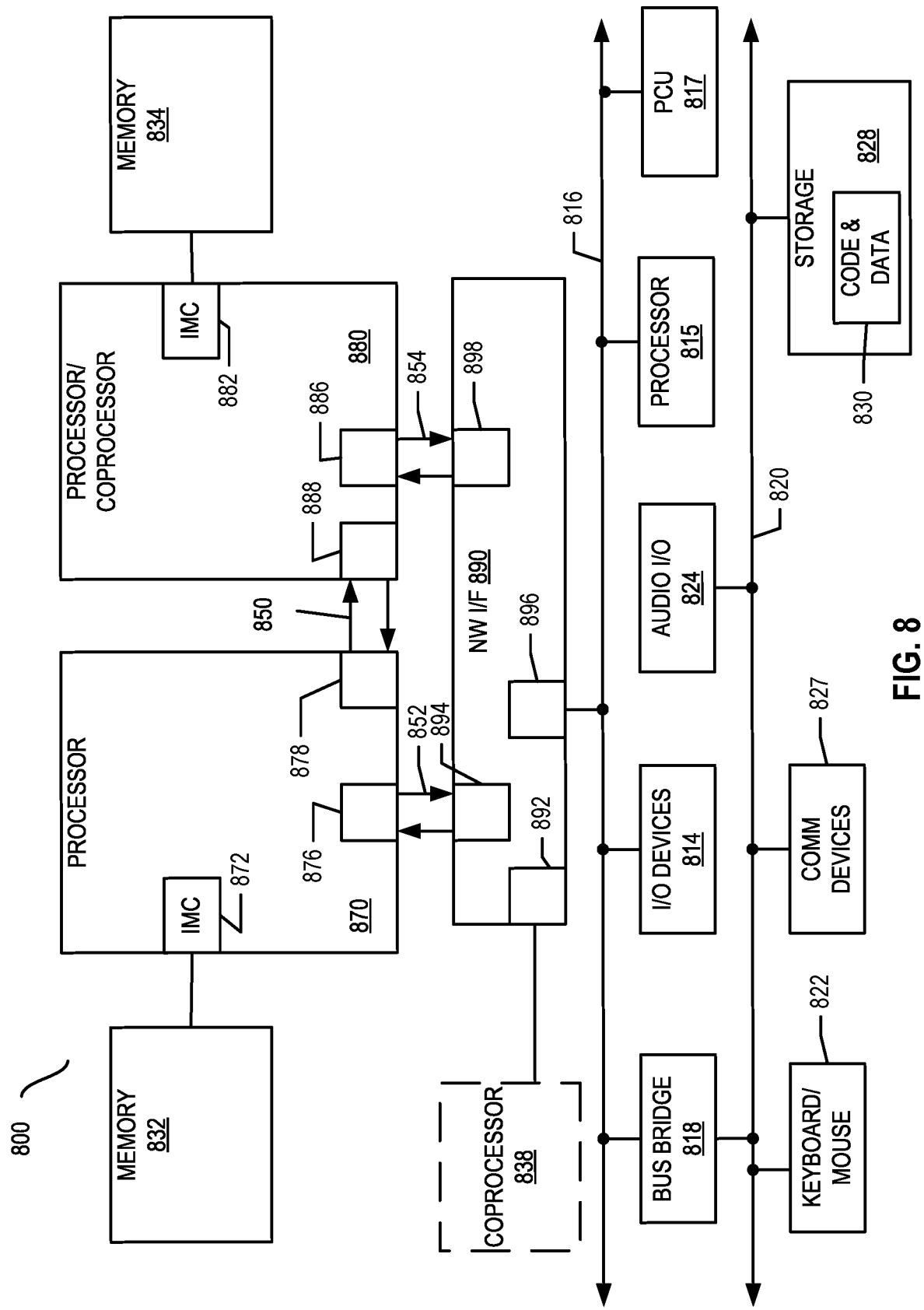
FIG. 8 illustrates an example computing system.

FIG. 8 illustrates an example computing system. Multi-processor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a SoC. Processors 870 and 880 may include cryptographic accelerators to perform balanced zero-value detection and additive-to-multiplicative (and vice versa) conversions as described herein.

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like (and which in some embodiments may include a cryptographic accelerator as described herein).

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 9:
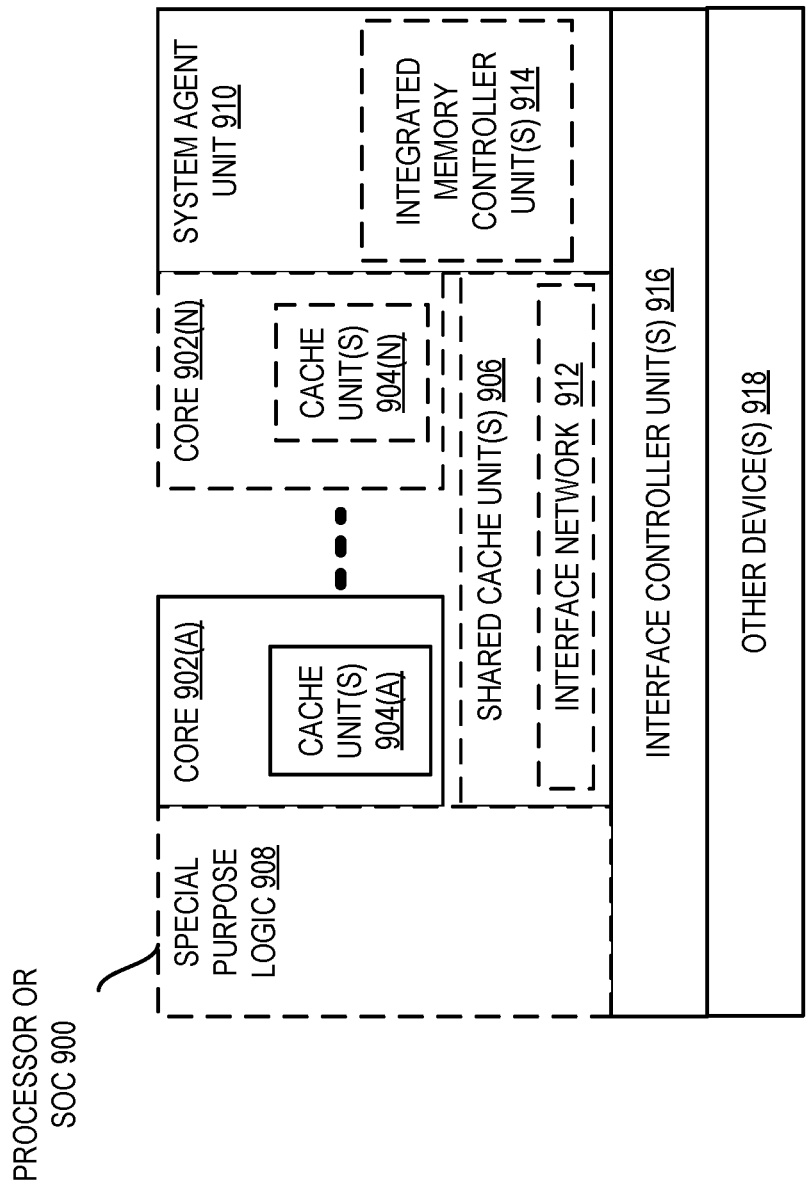
FIG. 9 illustrates a block diagram of an example processor in accordance with an embodiment.

FIG. 9 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 8. Special purpose logic 908 may, in an embodiment, be a cryptographic accelerators to perform balanced zero-value detection and additive-to-multiplicative (and vice versa) conversions as described herein.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two, where these cores may include a mix of assured and opportunistic cores in accordance with an embodiment); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908, the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA, and these cores may include a mix of assured and opportunistic cores as described herein.

The following examples pertain to further embodiments.

In Example 1, a method comprises: combining, in a first adder circuit of a cryptographic engine, a round key with masked plaintext to generate an additively masked input; converting, in a first converter of the cryptographic engine, the additively masked input to a multiplicatively masked input; and performing, in a substitution box (Sbox) circuit of the cryptographic engine, a non-linear inverse operation on the multiplicatively masked input when the multiplicatively masked input is non-zero and performing the non-linear inverse operation on a random non-zero value when the multiplicatively masked input is zero.

In Example 2, the method of Example 1 further comprises detecting that the multiplicatively masked input is zero in a balanced zero-value detector.

In Example 3, the method of Example 2 further comprises, in response to detecting that the multiplicatively masked input is zero: providing the random non-zero value to the Sbox circuit and to a second converter of the cryptographic engine, the second converter coupled to an output of the Sbox circuit; and converting, in the second converter, an output of the Sbox circuit to an additive output using the random non-zero value.

In Example 4, the method of Example 1 further comprises: generating a mask value in a random number generator; and combining the mask value with plaintext to obtain the masked plaintext.

In Example 5, the method of Example 4 further comprises: providing the mask value to a mask zero-value detector; and in response to detecting that the mask value is zero providing the random non-zero value to the Sbox circuit instead of the multiplicatively masked input.

In Example 6, converting the additively masked input to the multiplicatively masked input of any one of Examples 1-5 comprises: multiplying the additively masked input with a reflected mask value to obtain a first product; multiplying the reflected mask value with a mask value to obtain a second product; and combining the first product and the second product to obtain the multiplicatively masked input.

In Example 7, the method of any one of Examples 1-5 further comprises converting, in a second converter of the cryptographic engine, a multiplicative inverse output of the non-linear inverse operation to an additive inverse output.

In Example 8, converting the multiplicative inverse output to the additive inverse output of Example 7 comprises: multiplying a fresh mask value with an input mask value to obtain a first product; summing the first product with the multiplicative inverse output to obtain a sum; and merging the sum with an inverse of the input mask value to obtain the additive inverse output.

In Example 9, the method of Example 8 further comprises performing a Galois field ($2^4$) inverse operation to obtain the inverse of the input mask value.

In Example 10, performing the non-linear inverse operation of any one of Examples 1-9 comprises performing a Galois field ($2^4$) inverse operation to generate a multiplicative inverse output.

In Example 11, the method of Example 10 further comprises merging the multiplicative inverse output with a fresh mask value to obtain an additive inverse output.

In Example 12, at least one computer readable storage medium has stored thereon instructions, which if performed by a machine cause the machine to perform the method of any one of Examples 1 to 11.

In Example 13, an apparatus comprises means to perform a method as in any one of Examples 1 to 11.

In Example 14, an apparatus comprises: a first converter to convert an additive masked input to a multiplicative masked input; a substitution circuit to perform a composite-field substitution of bytes of the multiplicative masked input and output a multiplicative output; a zero-value detector coupled to the substitution circuit to detect a zero value of the multiplicative masked input, wherein in response to detection of the zero value of the multiplicative masked input, a non-zero value is to be provided to the substitution circuit instead of the multiplicative masked input; and a second converter coupled to the substitution circuit to convert the multiplicative output to an additive output.

In Example 15, the first converter of Example 14 comprises: a first multiplier to multiply the additive masked input with a reflected mask value to obtain a first product; a second multiplier to multiply the reflected mask value with a mask value to obtain a second product; and an adder to combine the first product and the second product to obtain the multiplicative masked input.

In Example 16, the second converter of Example 14 comprises: a first multiplier to multiply a fresh mask value with an input mask value to obtain a first product; an adder to sum the first product with the multiplicative output to obtain a sum; and a second multiplier coupled to the adder to multiply the sum with an inverse of the input mask value to obtain the additive output.

In Example 17, the zero-value detector of Example 14 comprises a balanced detector comprising: a first datapath to output an active zero detect signal when the multiplicative masked input has a zero value; and a second datapath to output an inactive complementary zero detect signal when the multiplicative masked input has the zero value.

In Example 18, the first datapath of Example 17 comprises first logic circuitry and the second datapath comprises second logic circuitry, the second logic circuitry to balance the first logic circuitry.

In Example 19, the apparatus of any one of Examples 14-18 further comprises a mask zero-value detector to detect a zero value within a mask value, and provide a random non-zero value to the substitution circuit in place of the detected zero value within the mask value.

In Example 20, a system comprises: a cryptographic accelerator to encrypt plaintext into ciphertext, the cryptographic accelerator comprising: a first adder to add a random mask value with the plaintext to generate a first sum; a second adder to add the first sum with a key to generate an additive masked input; a first converter to convert the additive masked input to a multiplicative masked input using a permuted mask value; a substitution circuit coupled to the first converter to perform a composite-field substitution of bytes of the multiplicative masked input and output a multiplicative output, wherein in response to detection of a zero value within a portion of the multiplicative masked input, the substitution circuit is to perform the composite-field substitution on a random non-zero value instead of the portion of the multiplicative masked input; and a second converter coupled to the substitution circuit to convert the multiplicative output to an additive output using a fresh mask value; and a memory coupled to the cryptographic accelerator, wherein the memory is to store the ciphertext.

In Example 21, the cryptographic accelerator of Example 20 comprises a dual-rail balanced zero-value detector to detect the zero value within the portion of the multiplicative masked input.

In Example 22, the system of Example 20 or Example 21 further comprises a system on chip comprising a plurality of cores and the cryptographic accelerator.

In Example 23, an apparatus comprises: means for combining a round key with masked plaintext to generate an additively masked input; means for converting the additively masked input to a multiplicatively masked input; and means for performing a non-linear inverse operation on the multiplicatively masked input when the multiplicatively masked input is non-zero, and for performing the non-linear inverse operation on a random non-zero value when the multiplicatively masked input is zero.

In Example 24, the apparatus of Example 23 further comprises means for detecting that the multiplicatively masked input is zero.

In Example 25, the apparatus of Example 23 or Example 24 further comprises: means for generating a mask value; and means for combining the mask value with plaintext to obtain the masked plaintext.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   combining, in a first adder circuit of a cryptographic engine, a round key with masked plaintext to generate an additively masked input;
   converting, in a first converter of the cryptographic engine, the additively masked input to a multiplicatively masked input; and
   performing, in a substitution box (Sbox) circuit of the cryptographic engine, a non-linear inverse operation on the multiplicatively masked input when the multiplicatively masked input is non-zero and performing the non-linear inverse operation on a random non-zero value when the multiplicatively masked input is zero.

2. The method of claim 1, further comprising detecting that the multiplicatively masked input is zero in a balanced zero-value detector.

3. The method of claim 2, further comprising, in response to detecting that the multiplicatively masked input is zero:
   providing the random non-zero value to the Sbox circuit and to a second converter of the cryptographic engine, the second converter coupled to an output of the Sbox circuit; and
   converting, in the second converter, an output of the Sbox circuit to an additive output using the random non-zero value.

4. The method of claim 1, further comprising:
   generating a mask value in a random number generator; and
   combining the mask value with plaintext to obtain the masked plaintext.

5. The method of claim 4, further comprising:
   providing the mask value to a mask zero-value detector; and
   in response to detecting that the mask value is zero, providing the random non-zero value to the Sbox circuit instead of the multiplicatively masked input.

6. The method of claim 1, wherein converting the additively masked input to the multiplicatively masked input comprises:
   multiplying the additively masked input with a reflected mask value to obtain a first product;
   multiplying the reflected mask value with a mask value to obtain a second product; and
   combining the first product and the second product to obtain the multiplicatively masked input.

7. The method of claim 1, further comprising converting, in a second converter of the cryptographic engine, a multiplicative inverse output of the non-linear inverse operation to an additive inverse output.

8. The method of claim 7, wherein converting the multiplicative inverse output to the additive inverse output comprises:
   multiplying a fresh mask value with an input mask value to obtain a first product;
   summing the first product with the multiplicative inverse output to obtain a sum; and
   merging the sum with an inverse of the input mask value to obtain the additive inverse output.

9. The method of claim 8, further comprising performing a Galois field (24) inverse operation to obtain the inverse of the input mask value.

10. The method of claim 1, wherein performing the non-linear inverse operation comprises performing a Galois field (24) inverse operation to generate a multiplicative inverse output.

11. The method of claim 10, further comprising merging the multiplicative inverse output with a fresh mask value to obtain an additive inverse output.

12. An apparatus comprising:
   an additive-to-multiplicative converter to convert an additive masked input to a multiplicative masked input;
   a substitution circuit to perform a composite-field substitution of bytes of the multiplicative masked input, and output a multiplicative output;
   a zero-value detector coupled to the substitution circuit to detect a zero value of the multiplicative masked input, wherein in response to detection of the zero value of the multiplicative masked input, a non-zero value is to be provided to the substitution circuit instead of the multiplicative masked input; and a multiplicative-to-additive converter coupled to the substitution circuit to convert the multiplicative output to an additive output.

13. The apparatus of claim 12, wherein the additive-to-multiplicative converter comprises:

a first multiplier to multiply the additive masked input with a reflected mask value to obtain a first product;

a second multiplier to multiply the reflected mask value with a mask value to obtain a second product; and an adder to combine the first product and the second product to obtain the multiplicative masked input.

14. The apparatus of claim 12, wherein the multiplicative-to-additive converter comprises:

a first multiplier to multiply a fresh mask value with an input mask value to obtain a first product;

an adder to sum the first product with the multiplicative output to obtain a sum; and a second multiplier coupled to the adder to multiply the sum with an inverse of the input mask value to obtain the additive output.

15. The apparatus of claim 12, wherein the zero-value detector comprises a balanced detector comprising:

a first data path to output an active zero detect signal when the multiplicative masked input has a zero value; and a second data path to output an inactive complementary zero detect signal when the multiplicative masked input has the zero value.

16. The apparatus of claim 15, wherein the first data path comprises first logic circuitry and the second data path comprises second logic circuitry, the second logic circuitry to balance the first logic circuitry.

17. The apparatus of claim 12, further comprising a mask zero-value detector to detect a zero value within a mask value, and provide a random non-zero value to the substitution circuit in place of the detected zero value within the mask value.

18. A system comprising:

a cryptographic circuit to encrypt plaintext into ciphertext, the cryptographic circuit comprising:

a first exclusive-OR (XOR) circuit to add a random mask value with the plaintext to generate a first sum;

a second XOR circuit to add the first sum with a key to generate an additive masked input;

an additive-to-multiplicative converter to convert the additive masked input to a multiplicative masked input using a permuted mask value;

a substitution circuit coupled to the additive-to-multiplicative converter to perform a composite-field substitution of bytes of the multiplicative masked input, and output a multiplicative output, wherein in response to detection of a zero value within a portion of the multiplicative masked input, the substitution circuit is to perform the composite-field substitution on a random non-zero value instead of the portion of the multiplicative masked input; and a multiplicative-to-additive converter coupled to the substitution circuit to convert the multiplicative output to an additive output using a fresh mask value; and a memory coupled to the cryptographic circuit, wherein the memory is to store the ciphertext.

19. The system of claim 18, wherein the cryptographic circuit comprises a dual-rail balanced zero-value detector to detect the zero value within the portion of the multiplicative masked input.

20. The system of claim 18, further comprising a system on chip comprising a plurality of cores and the cryptographic circuit.

* * * * *